United States Patent
Lin

(10) Patent No.: US 7,126,613 B2
(45) Date of Patent: Oct. 24, 2006

(54) GRAPHIC PROCESSING METHOD

(75) Inventor: Fu-Chang Lin, Taipei (TW)

(73) Assignee: Destiny Technology Corporation, Taipei (TW)

( * ) Notice: Subject to any disclaimer, the term of this patent is extended or adjusted under 35 U.S.C. 154(b) by 253 days.

(21) Appl. No.: 10/911,694

(22) Filed: Aug. 5, 2004

(65) Prior Publication Data

US 2006/0028486 A1    Feb. 9, 2006

(51) Int. Cl.
     *G09G 5/02*      (2006.01)
     *G06K 9/00*      (2006.01)
     *G06F 15/00*      (2006.01)
     *G03F 3/00*      (2006.01)
     *H04N 1/46*      (2006.01)

(52) U.S. Cl. .................... 345/603; 345/589; 345/591; 345/604; 358/1.1; 358/3.11; 358/518; 382/162; 382/167; 715/500; 715/911

(58) Field of Classification Search ................ 358/1.1, 358/3.11, 515, 518; 345/589–593, 597, 600, 345/603–604; 382/162–167; 715/500, 909, 715/911; 348/577, 582
See application file for complete search history.

(56) References Cited

U.S. PATENT DOCUMENTS

2001/0021971 A1*    9/2001    Gibson et al. .............. 712/215

* cited by examiner

*Primary Examiner*—Wesner Sajous
(74) *Attorney, Agent, or Firm*—Harness, Dickey & Pierce, P.L.C.

(57) ABSTRACT

A graphic processing method is implemented to determine which processing method is to be performed to improve graphic processing speed. First, it is determined whether the document page to be processed includes a large amount of graphics, in which case the document page is divided into a plurality of blocks to be sampled. First and second processing methods are then applied to the block samples to determine which processing method requires less time. The graphic processing method of shorter time duration is then implemented to process the whole document page.

3 Claims, 4 Drawing Sheets

GRAPHIC PROCESSING METHOD

BACKGROUND OF THE INVENTION

1. Field of Invention

The invention relates to a graphic processing method suitable for printing actions of a printing machine.

2. Related Art

To process graphics for printing, a conventional printing machine usually implements two methods. A first processing method is performed with respect to graphics with color variations (for example, graphics with gradual color variations). Because each color dot is different from another, the first processing method needs to convert each graphic dot from the RGB color mode to the CMYK color mode before the dot layout is processed. In other words, once the graphic data are accessed from the storage addresses, logic computing is performed before color mode conversion and then storage to the target addresses. The second processing method is performed with respect to graphics without color variation (for example, monochromatic graphics without color variation). Because every dot is the same color, the second processing method differs from the first processing method in that it does not require logic computing for converting the color mode of each dot. Instead, the graphic data is accessed from the storage addresses, and then the color of only one graphic dot needs to be converted to modify the color of all other graphic dots. Subsequently, the converted graphic data are stored in the target addresses. In other words, the second processing method converts the color part of the graphics, i.e. one graphic dot, from RGB color mode to CMYK color mode, which then is combined with the shape part of the graphics to complete the dot layout process. Conventionally, the first or second processing method is implemented to process all the graphics of one document page. When the number of pages increases, the implementation of different processing methods might result in a substantial difference in the processing time.

However, the conventional method of determining whether either the first or second processing method is to be used is not satisfactory. Therefore, it is necessary to create a method by which one can determine which processing method is to be performed in order to reduce processing time.

SUMMARY OF THE INVENTION

An objective of the invention is therefore to provide a graphic processing method that can reduce processing time.

To process graphics for printing, a conventional printing machine usually implements two methods. A first processing method is performed with respect to graphics with color variations (for example, graphics with gradual color variations). Because each color dot is different from another, the first processing method needs to convert each graphic dot from RGB color mode to CMYK color mode before the dot layout is processed. In other words, once the graphic data are accessed from the storage addresses, logic computing is performed before color mode conversion and then storage to the target addresses. The second processing method is performed with respect to graphics without color variation (for example, monochromatic graphics without color variation). Because every dot is the same color, the second processing method differs from the first processing method in that it does not require logic computing for converting the color mode of each dot. Instead, the graphic data is accessed from the storage addresses, and then the color of only one graphic dot needs to be converted to modify the color of all the other graphic dots. Subsequently, the converted graphic data are stored in the target addresses. In other words, the second processing method converts the color part of the graphics, i.e. one graphic dot, from RGB color mode to CMYK color mode, which then is combined with the shape part of the graphics to accomplish the dot layout process. Conventionally, the first or second processing method is implemented to process all the graphics of one document page. When the number of pages increases, the implementation of different processing methods might result in a substantial difference in the processing time. Therefore, it is necessary to determine which processing method is to be performed to reduce processing time.

According to an embodiment of the invention, the graphic processing method comprises the following steps implemented to determine whether the first or second processing method is to be performed to improve graphic processing speed. First, it is determined whether the document page to be processed includes a large amount of graphics, in which case the document page is divided into a plurality of blocks to be sampled. The first and second processing methods are then applied to the block samples to determine which processing method requires less time. The faster graphic processing method is implemented to process the whole document page.

According to another embodiment of the invention, the graphic processing method further comprises the following steps.

First, it is determined whether graphic processing commands with respect to graphics on a document page are greater than processing commands with respect to text and images of the document page.

The document page then is divided into a plurality of blocks that are stored. The blocks then are sampled to obtain a plurality of block samples, which are also stored.

The first processing method and the second processing method are then applied to the block samples to obtain a first processing time and a second processing time.

Lastly, it is determined whether the first or second processing time is shorter. The corresponding processing method of shorter processing time is implemented to process the document page.

The above first or second processing method can be thereby implemented to process the document page with a reduced processing time.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DETAILED DESCRIPTION OF THE INVENTION

To process graphics for printing, a conventional printing machine usually implements two methods. A first processing method is performed with respect to graphics with color variations (for example, graphics with gradual color variations). Because each color dot is different from another, the first processing method needs to convert each graphic dot from RGB color mode to CMYK color mode before the dot layout is processed. In other words, once the graphic data are accessed from the storage addresses, logic computing is performed before color mode conversion and then storage to the target addresses. The second processing method is performed with respect to graphics without color variation (for example, monochromatic graphics without color variation). Because every dot is the same color, the second processing method differs from the first processing method in that it does not require logic computing for converting the color mode of each dot. Instead, the graphic data is accessed from the storage addresses, and then the color of only one graphic dot needs to be converted to modify the color of all other graphic dots. Subsequently, the converted graphic data are stored in the target addresses. In other words, the second processing method converts the color part of the graphics, i.e. one graphic dot, from RGB color mode to CMYK color mode, which then is combined with the shape part of the graphics to complete the dot layout process. Conventionally, the first or second processing method is implemented to process all the graphics of one document page. When the number of pages increases, the implementation of different processing methods might result in a substantial difference in the processing time. Therefore, it is necessary to determine which processing method is to be performed to reduce processing time.

Figure 1:
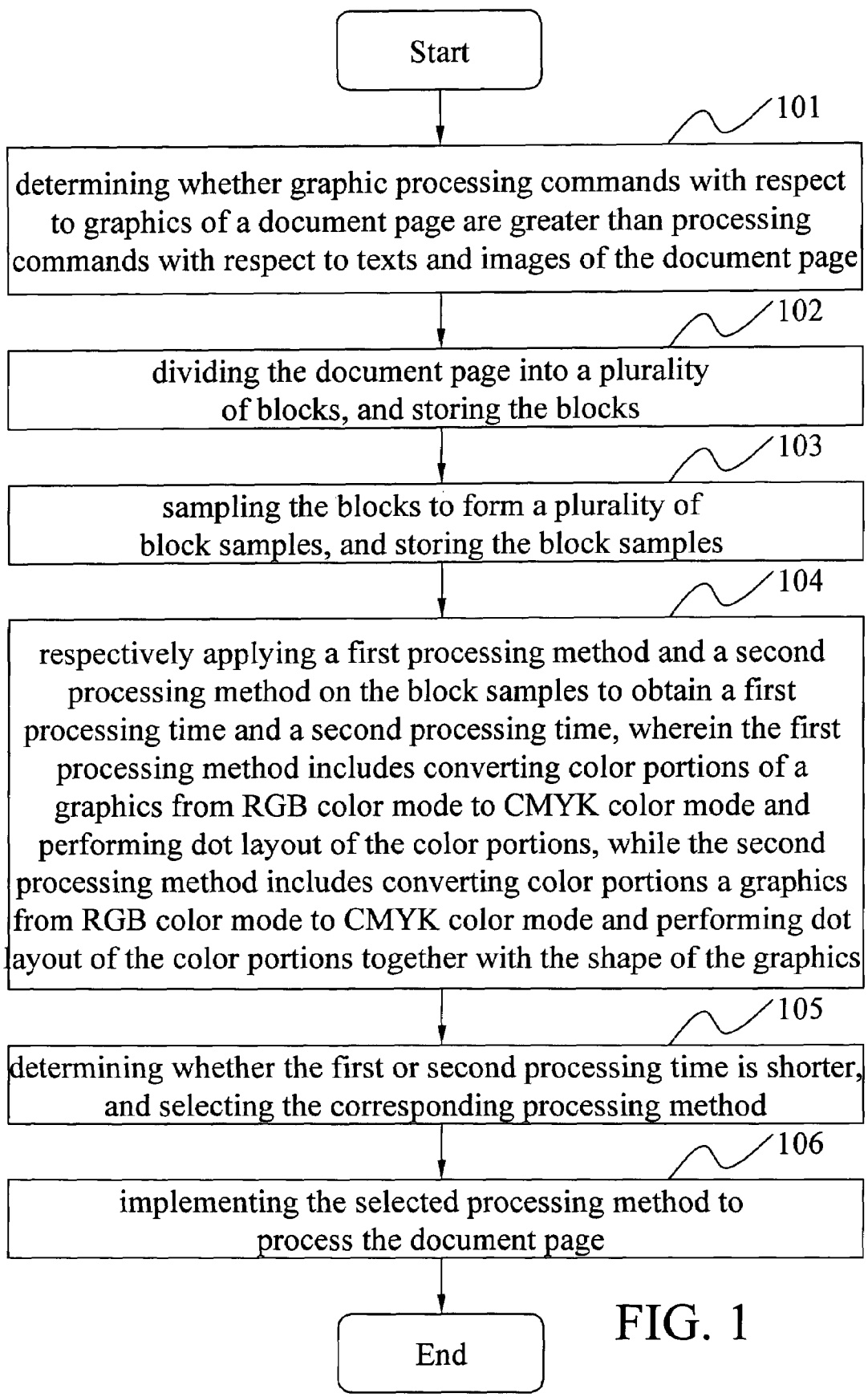
FIG. 1 is flowchart of a graphic processing method according to an embodiment of the invention.

The invention describes a graphics processing method that can determine whether the first or second processing method is to be performed to improve graphic processing speed. First, it is determined whether the document page to be processed includes a large amount of graphics, in which case the document page is divided into a plurality of blocks to be sampled. The first and second processing methods are then applied to the block samples to determine which processing method requires less time. The faster graphic processing method is implemented to process the whole document page. FIG. 1 is a flowchart of an embodiment of the invention.

First, it is determined whether the graphic processing commands with respect to the graphics of one document page are greater than the text processing commands and image processing commands (step 101). In other words, it is determined whether the number of graphics in the document page is greater, which results in a significant difference in processing time.

The document page is then divided into blocks that are stored up (step 102). The blocks are sampled to form a plurality of sampled blocks that are also stored (step 103). That is, the document page is divided into a plurality of blocks that are sampled to obtain sampled blocks. Of course, the more sampled blocks, the longer time spent for the subsequent processing steps, but a more precise estimate is obtained for the time spent by the first and second graphic processing methods.

Next, the first and second processing methods are implemented to process the sampled blocks, thereby providing a first processing time and second processing time (step 104).

The implementation of the first and second processing methods provides their respective first and second processing times.

It is then determined whether the first or second processing time is shorter so as to utilize the appropriate processing method (step 105). The first processing method is chosen if its processing time spent for processing the sampled blocks is shorter. Conversely, the second processing method is chosen if its processing time spent for processing the sampled blocks is shorter.

Lastly, the chosen processing method is implemented to process the entire document page (step 106). Therefore, either the first or second processing method can be selected to process the graphics of the document page within the shortest time.

Figure 4:
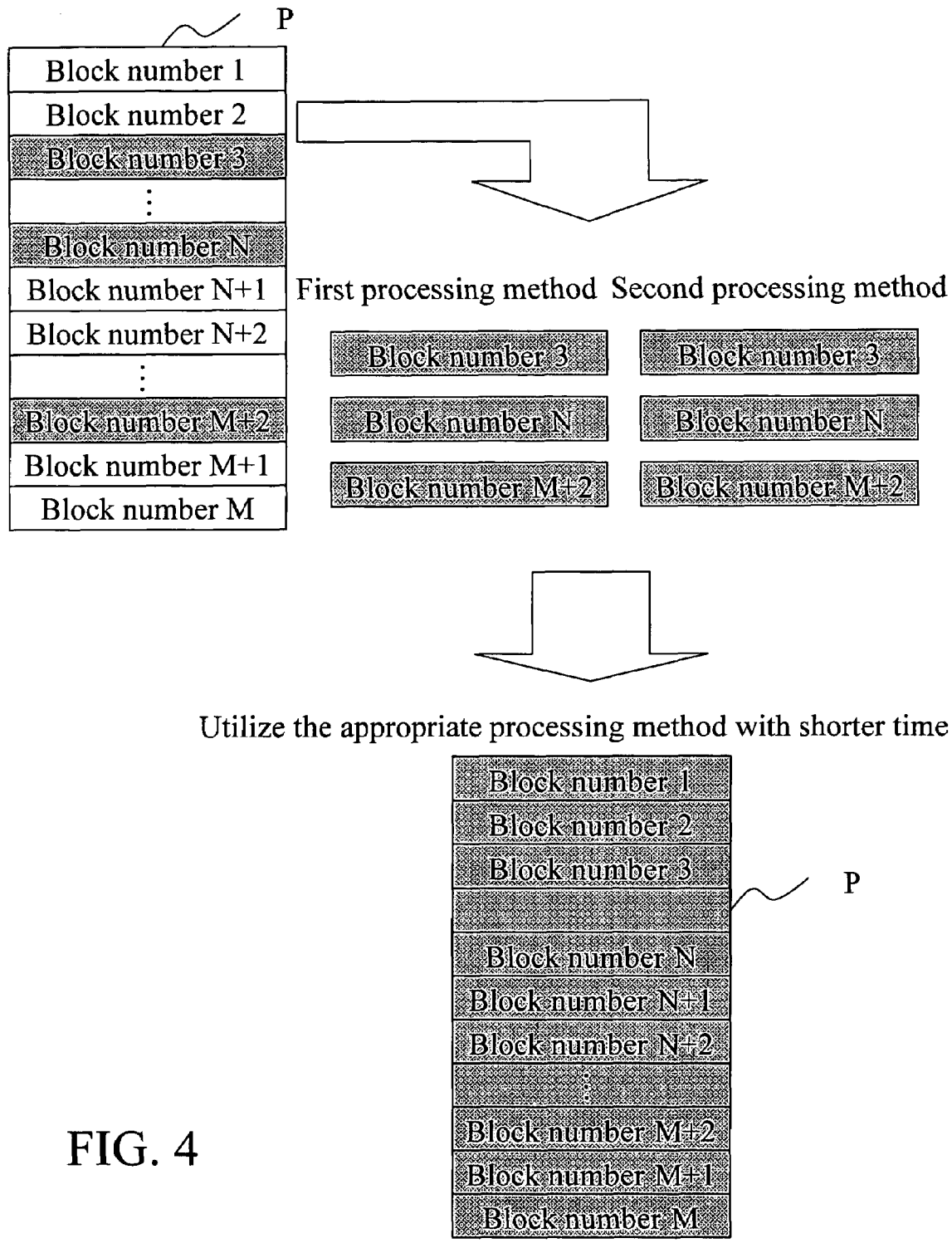
FIG. 4 is a schematic view of a sampling scheme implemented in the method according to an embodiment of the invention.

FIG. 4 is a schematic view of a sampling method implemented in an embodiment of the invention. After the determination step 101 has been completed, the document page P can be divided into a plurality of blocks, being illustrated as block numbers 1, 2, 3, N, N+1, N+2, M+2, M+1, M. Among the blocks are sampled the block number 3, N, (M−2). The first and second processing methods are then implemented to process the block sample number 3, N, (M−2), thereby obtaining the first and second processing times. The faster processing method is then selected to process the document page.

Figure 2:
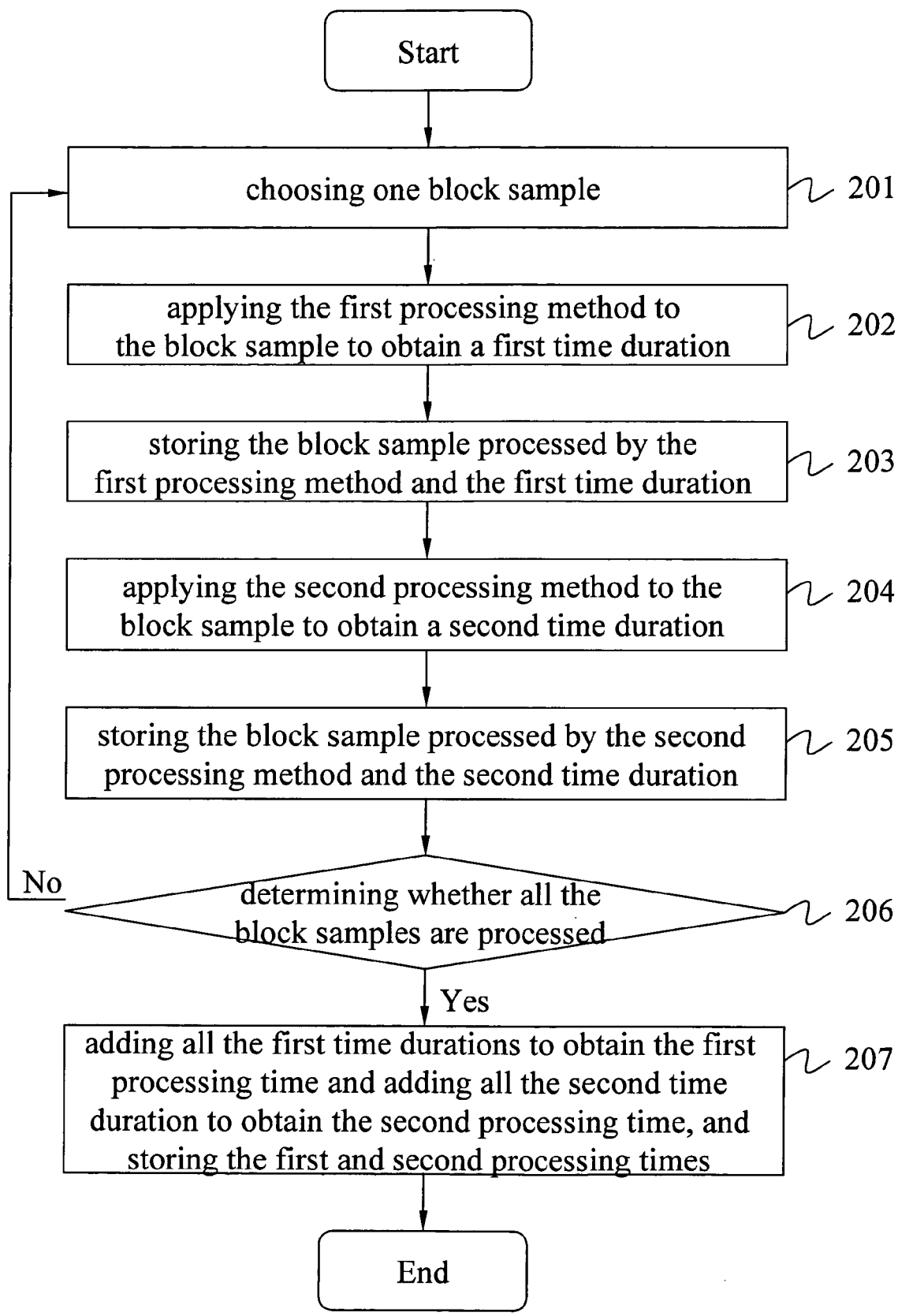
FIG. 2 is a flowchart of the sub-steps of step 104 in FIG. 1 according to an embodiment of the invention.

FIG. 2 is a flowchart of the sub-steps of step 104 in FIG. 1. Step 104 further includes the following sub-steps implemented to sequentially process the block samples by the first and second processing method and obtain the first and second processing times.

First, one block sample is chosen (sub-step 201).

The first processing method is then applied to the chosen block sample to obtain a first time duration in respect to this block sample (sub-step 202).

The block sample processed by the first processing method and the corresponding first time duration are then stored (sub-step 203). Having undergone graphic processing of the first processing method, the block sample being stored can be used in subsequent process flows.

The same block sample then undergoes the second processing method to obtain a second time duration (sub-step 204).

The block sample processed by the second processing method and the corresponding second time duration are then stored (sub-step 205). Having undergone graphic processing of the second processing method, the block sample being stored can be used in subsequent process flows.

It is then determined whether all block samples have been processed (sub-step 206). If there are any block samples not yet processed, return to sub-step 201 to execute the same sequence as described above until all block samples are processed.

The sum of all the first time durations and the sum of all the second time durations obtained for each block sample processed are calculated to obtain first and second processing times, which are then stored (sub-step 207). The first and second processing times can thereby be compared in subsequent process flows.

Figure 3:
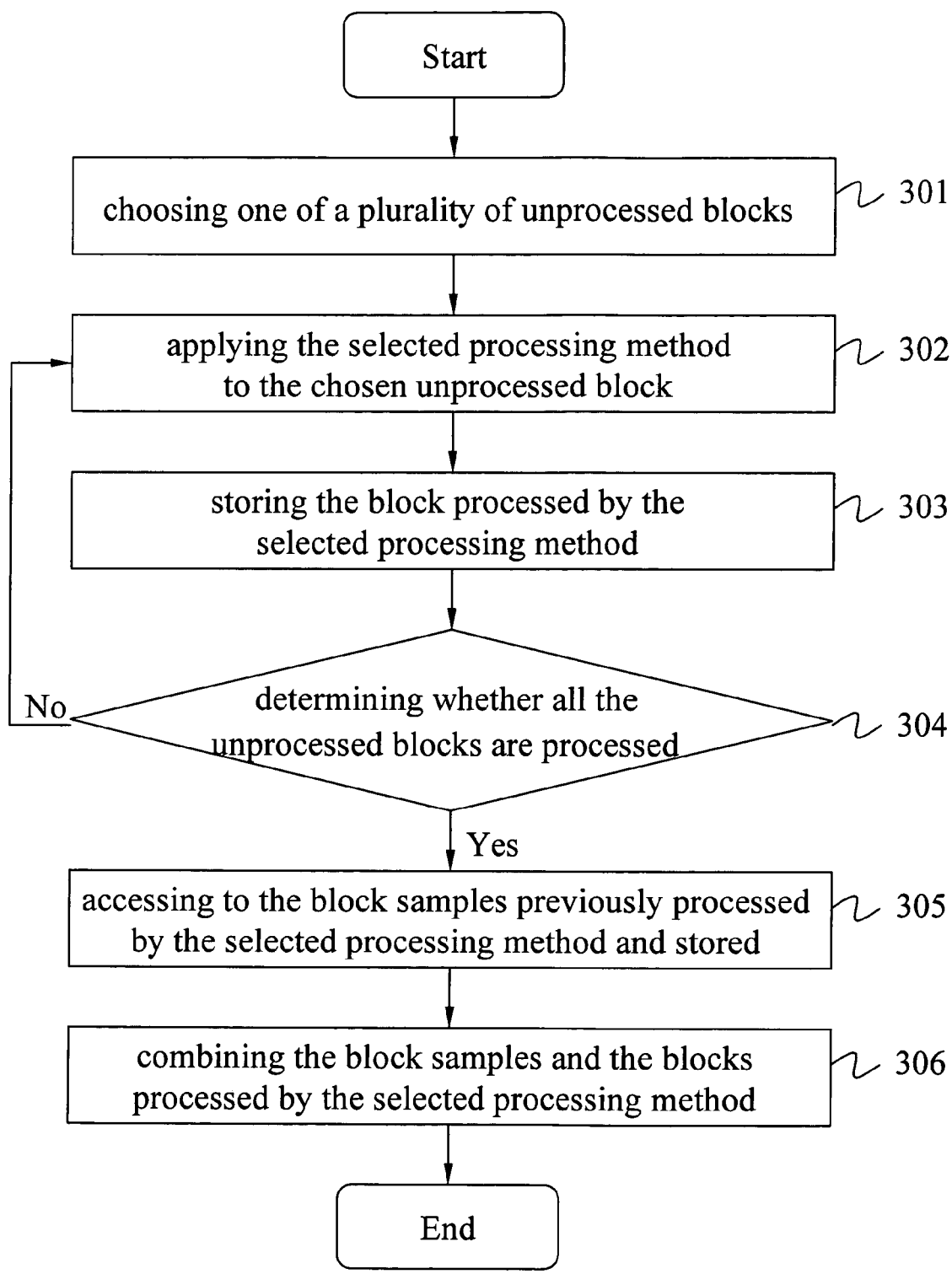
FIG. 3 is a flowchart of the sub-steps of step 106 in FIG. 1 according to an embodiment of the invention.

FIG. 3 is a schematic view of the sub-steps of step 106 in FIG. 1. Step 106 further includes the following sub-steps implemented to process within a shorter processing time the blocks not yet addressed by the graphical processing method.

The unprocessed blocks are accessed to constitute a plurality of to-be-processed blocks (sub-step 301). The unprocessed blocks are processed to achieve processing of the entire document page.

The processing method of shorter processing time is implemented to process one unprocessed block (sub-step 302).

The processed block is then stored (sub-step 303).

It is then determined whether all the blocks have been processed (sub-step 304). If there remain unprocessed blocks, return to sub-step 302 to execute the same sequence as described above until all unprocessed blocks are processed.

All the stored block samples having been previously processed by the processing method of shorter processing time are then accessed (sub-step 305). All the block samples and blocks processed by the processing method of shorter processing time are then combined to obtain a completely processed document page.

It will be apparent to the person skilled in the art that the invention as described above may be varied in many ways, which notwithstanding remaining within the spirit and scope of the invention as defined in the following claims.

What is claimed is:

1. A graphic processing method comprising:
   determining whether graphic processing commands with respect to graphics of a document page are greater than processing commands with respect to texts and images of the document page;
   dividing the document page into a plurality of blocks, and storing the blocks;
   sampling the blocks to form a plurality of block samples, and storing the block samples;
   respectively applying a first processing method and a second processing method on the block samples to obtain a first processing time and a second processing time, wherein the first processing method includes converting color portions of a graphics from RGB color mode to CMYK color mode and performing dot layout of the color portions, while the second processing method includes converting color portions of a graphics from RGB color mode to CMYK color mode and performing dot layout of the color portions together with the shape of the graphics;
   determining whether the first or second processing time is shorter, and selecting the corresponding processing method; and
   implementing the selected processing method to process the document page.

2. The graphic processing method of claim 1, wherein respectively applying a first processing method and a second processing method on the block samples to obtain a first processing time and a second processing time further comprises:
   choosing one block sample;
   applying the first processing method to the block sample to obtain a first time duration;
   storing the block sample processed by the first processing method and the first time duration;
   applying the second processing method to the block sample to obtain a second time duration;
   storing the block sample processed by the second processing method and the second time duration;
   determining whether all the block samples are processed; and
   adding all the first time durations to obtain the first processing time and adding all the second time duration to obtain the second processing time, and storing the first and second processing times.

3. The graphic processing method of claim 2, wherein implementing the selected processing method to process the document page further comprises:
   choosing one of a plurality of unprocessed blocks;
   applying the selected processing method to the chosen unprocessed block;
   storing the block processed by the selected processing method;
   determining whether all the unprocessed blocks are processed;
   accessing to the block samples previously processed by the selected processing method and stored; and
   combining the block samples and the blocks processed by the selected processing method.

* * * * *